Dec. 3, 1968         J. B. ROGERS, JR         3,414,272
                        PISTON RINGS
                   Filed March 11, 1966

INVENTOR.
John B. Rogers, Jr.
BY William S. Dorman
ATTORNEY

United States Patent Office 3,414,272
Patented Dec. 3, 1968

3,414,272
PISTON RINGS
John B. Rogers, Jr., 1209 Summit,
Muskogee, Okla. 74401
Filed Mar. 11, 1966, Ser. No. 533,690
5 Claims. (Cl. 277—2)

ABSTRACT OF THE DISCLOSURE

A piston ring provided with a plurality of spaced sequentially deeper annular grooves on the outer periphery of the body portion to provide visual means for determination of the amount and rate of wear on the piston ring during use thereof.

---

This invention relates to improvements in piston rings and more particularly, but not by way of limitation, to piston rings for use in two cycle diesel engines, internal combustion engines, piston type machinery, or the like, for facilitating the determination of optimum timing for inspection of the piston rings for wear and replacement.

Piston rings, particularly of the type utilized in two cycle diesel engines, internal combustion engines, piston type machinery, or the like, are usually constructed or provided with grooves around the outer periphery thereof or on the portions thereof which ride against the cylinder walls. The piston rings are normally visually inspected periodically through inspection ports to determine the amount of wear and to ascertain when they should be replaced. These grooves are of equal depths and the inspection process normally comprises a visual inspection of the grooves on the outer periphery of the rings. When the piston ring has been worn until the grooves have become sufficiently worn away from the outer periphery, it is usually determined that the rings have become worn to the point wherein they should be replaced. If the wear exceeds the depth of the groove, ring gap may occur which, if excessive, creates the escape of compression. Whereas this method ascertains when the rings have been worn sufficiently to be replaced, since the grooves are all of the same depth there has been no way to ascertain the rate of wear on the rings prior to the complete wearing away of the grooves. As a result, often times when the ring is inspected, it is found that the grooves are completely gone or worn away, and it is possible that too much time has elapsed before replacement of the ring. The disadvantages of this will be apparent.

The present invention contemplates a novel piston ring particularly designed and constructed for facilitating the visual inspection of wear on the ring. Thus, it becomes possible to ascertain the optimum timing for the inspection of the rings or for changing the piston rings to avoid an "over wear" condition. The novel piston rings are provided with a plurality of annular grooves or spaced indentations on the outer periphery thereof which may be readily viewed during the visual inspection of the pistons. Each groove is of a different depth than the remaining grooves, and as the rings wear down, the grooves begin to disappear from the outer periphery of the piston ring, it is possible to determine the speed or rate at which the piston rings are being worn during operation of the engine. For example, each groove may be at a depth approximately .0005 inch greater than the preceding groove or indentation whereby it is possible to observe when a known amount of wear has occurred on the piston rings as the groove or grooves are no longer visible. As a result, the inspector is able to determine in advance approximately when the rings will wear out, and thus, when it is best to replace the rings to avoid any "over wear" thereof.

It is an important object of this invention to provide a novel piston ring for facilitating the inspection thereof for wear.

It is another object of this invention to provide a novel piston ring particularly designed and constructed to provide a visual inspection for determining the rate of wear of the piston ring during use.

A further object of this invention is to provide a novel piston ring which permits an optimum timing for use thereof while substantially precluding any "over wear" of the rings.

Another object of this invention is to provide a novel piston ring which is simple and efficient in operation and economical and durable in construction.

Other objects and advantageous features of the present invention will hereinafter more fully appear in connection with a detailed description of the drawings in which.

Figure 1:
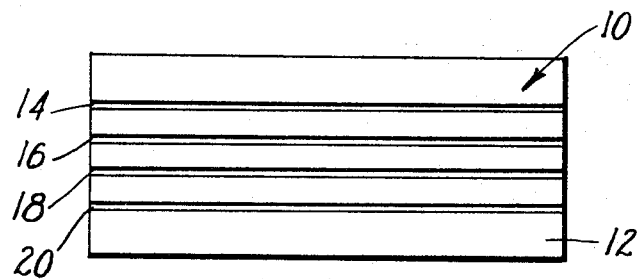
FIGURE 1 is a side elevational view of a piston ring embodying the invention.
Figure 2:
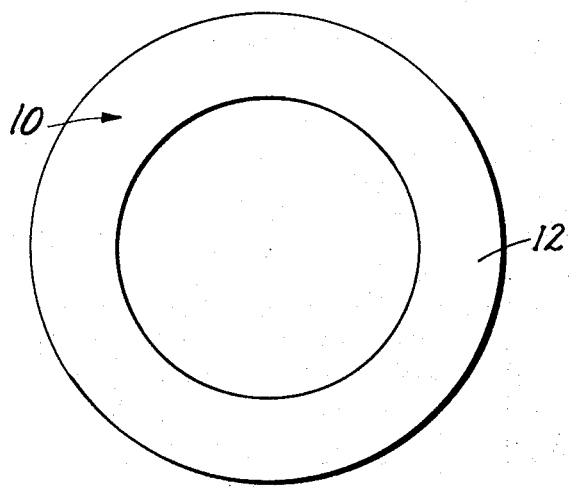
FIGURE 2 is a plan view of a piston ring embodying the invention.

Referring to the drawings in detail, reference character 10 generally indicates a piston ring which may be of any suitable type and as shown herein comprises an annular body 12 having a substantially cylindrical outer periphery. A plurality of annular grooves 14, 16, 18 and 20 are provided around the outer periphery of the body 12 and are longitudinally spaced therealong as particularly shown in FIGURE 1. Whereas four of the annular grooves are depicted herein, it is to be understood that substantially any number of suitable grooves or other indentations may be provided on the outer periphery of the body 12, as desired.

The grooves 14, 16, 18 and 20 are differing depths, as will be hereinafter set forth in detail, and are preferably arranged in ascending order whereby each succeeding groove is of a greater depth than the immediately preceding groove, or each succeeding groove is of a lesser depth than the immediately preceding groove. In addition, it is preferable that the increment of depth differential between the succeeding grooves be of a known and substantially constant dimension whereby a determination of the amount of wear on the outer periphery of the piston ring may be determined by a visual inspection of the state of the grooves remaining on the periphery thereof after periods or time intervals of usage.

Figure 3:
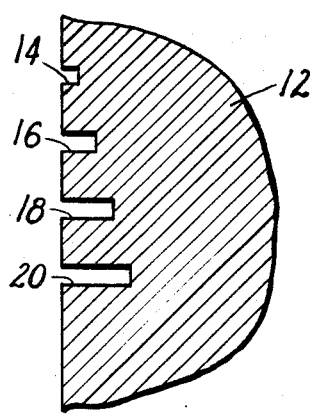
FIGURE 3 is an enlarged broken sectional view showing the piston ring grooves.

Referring particularly to FIGURE 3 the groove 14 may be of substantially any known depth with the grooves 16, 18 and 20 being of differing depths with the depth increment therebetween being known. By way of example, the groove 14 may be of a depth of .0010 inch, the next succeeding groove 16 of a depth of .0015 inch, the next succeeding groove 18 of a depth of .0020 inch, and the next suceeding grove 20 of a depth of .0025 inch. Thus, upon each visual inspection of the pistons, depending upon which groove or grooves remain visible on the outer periphery of the piston ring, it is possible to ascertain or determine the amount of wear which has occured on the ring. In addition, it will be apparent that it is possible to ascertain the approximate rate of wear in order to determine the optimum timing for the next inspection, or it will be possible to ascertain in advance approximately when the rings should be sufficiently worn to be ready for replacement.

As an illustration, if the first groove 14 appears to be substantially completely worn off the outer periphery of the piston ring upon the first inspection, then it may be determined that the rate of wear of the ring is equal to approximately .0010 inch per period of elapsed time from the beginning of use of the ring and the time of the first inspection. Accordingly, the timing for the next inspection may be determined wherein it may be expected to find a similar rate of wear. Of course, the periodical inspections provide for more accurate calculating of the rate of wear, and it is possible to ascertain in advance the optimum timing for removal and replacement of the worn rings.

From the foregoing it will be apparent that the present invention provides a novel piston ring having a plurality of annular grooves spaced along the outer periphery thereof. The grooves are of a sequential depth gauge or depth differential whereby visual inspection of the rings during usage will permit the determination of the amount of wear on the rings, as well as providing a means for determining the rate of wear on the rings. As a result, it is possible to determine the optimum timing for the inspection periods, and to ascertain in advance the approximate time when the rings should be sufficiently worn for replacement, thus substantially avoiding any accidental "over wear" condition of the rings.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A piston ring comprising a body portion, a plurality of spaced annular grooves provided on the outer periphery of the body portion and extending around the outer periphery thereof, each of said grooves being of a distinctive characteristic with respect to every other groove to provide visual means for determination of the amount and rate of wear on the piston ring.

2. A piston ring as set forth in claim 1 wherein each of said grooves is of a different depth than each of the remaining grooves for providing for the determination of the amount and rate of wear.

3. A piston ring as set forth in claim 2 wherein the differing depths of said grooves is of a sequential relationship.

4. A piston ring as set forth in claim 1 wherein the first of said grooves is of a preselected known depth, and each succeeding annular groove is of a preselected known depth of a greater dimension in a sequential relationship.

5. A piston ring as set forth in claim 1 wherein the first of said grooves is of a preselected known depth, and each of the succeeding grooves is of a preselected depth greater than the immediately preceding groove with the depth increment between each successive groove being of a known dimension.

References Cited

UNITED STATES PATENTS

| 2,706,509 | 4/1955 | White | 152—330 X |
| 2,987,354 | 6/1961 | Olson | 92—244 |

FOREIGN PATENTS 441,634  1/1936  Great Britain.

SAMUEL ROTHBERG, *Primary Examiner.*